United States Patent [19]
Matanzon et al.

[11] Patent Number: 5,438,202
[45] Date of Patent: Aug. 1, 1995

[54] STABILIZED SCATTER FREE GAMMA CAMERA IMAGES

[75] Inventors: Alex Matanzon; Gideon Berlad; Dov Maop; Yigal Shrem; Adrian Sott, all of Haifa, Israel

[73] Assignee: Elscint Ltd., Haifa, Israel

[21] Appl. No.: 254,571

[22] Filed: Jun. 6, 1994

Related U.S. Application Data

[63] Continuation-in-part of Ser. No. 889,406, May 28, 1992.

[51] Int. Cl.[6] .............................................. G01T 1/161
[52] U.S. Cl. ........................ 250/363.07; 250/363.02; 364/413.24
[58] Field of Search .................. 364/413.13, 413.24; 378/7; 250/363.02, 363.04, 363.07

[56] References Cited

U.S. PATENT DOCUMENTS

| | | | |
|---|---|---|---|
| 4,780,823 | 10/1988 | Stoub et al. | 364/413.13 |
| 4,839,808 | 6/1989 | Koral et al. | 364/413.24 |
| 5,227,968 | 7/1993 | Ichihara | 364/413.24 |
| 5,293,195 | 3/1994 | Belad et al. | 364/423.24 |
| 5,315,506 | 5/1994 | Wang et al. | 364/413.19 |

OTHER PUBLICATIONS

Axelsson et al. "Subtraction of Compton-Scattered Photons in Single-Photon Emission Computerized Tomography", The Journal of Nuclear Medicine, 1984, pp. 490-494.

Primary Examiner—Paul M. Dzierzynski
Assistant Examiner—David Vernan Bruce
Attorney, Agent, or Firm—Sandler, Greenblum & Bernstein

[57] ABSTRACT

A system for recording fewer of the events that are caused by unwanted photons with greater stability. The system locally determines the energy spectrum and fits for each pixel of the image the determined energy spectrum with a modified trial function composed of: a photopeak component of known energy shape, Compton scatter components having theoretically derived energy shapes and, when applicable, also measured or calculated energy spectra of other unwanted photons. The modified trial function also takes into consideration unknown local deviations in the outputs of electronic components. The amplitude of the photopeak distribution resulting from the fit is used to obtain the local content of wanted interactions in the image. This enables removal of Compton contamination and also the contamination caused by interaction of the gamma photons with lead components.

50 Claims, 3 Drawing Sheets

STABILIZED SCATTER FREE GAMMA CAMERA IMAGES

This invention is a continuation in part of the application filed in the United States on May 28, 1992 which received Ser. No. 07/889,406 and is concerned with gamma camera imaging and, more particularly, with methods and systems for obtaining images having reduced artifacts due to multiple photopeaks and unwanted events. An event is herein defined as a photon striking the gamma camera detector and causing a scintillation that is acquired as data for use in constructing an image. The application Ser. No. 07/889,406 was an improvement to the invention entitled "Compton-Free Gamma Camera Images" filed in the United States on May 15, 1991, and which received Ser. No. 700,420 now U.S. Pat. No. 5,293,195 issued Mar. 8, 1994; so this invention is a further improvement on the 700,420 application. The disclosure of each of these applications is incorporated by reference in its entirety.

BACKGROUND OF THE INVENTION

In passing through the human body, gamma photons have a certain probability of scattering due to the Compton effect. Such scattering changes the direction and energy of the photons. When a photon that has been scattered is detected by the gamma camera, false position information is derived from the scattered photons. Thus, the scattered photons cause events that are unwanted for use in constructing the image. Other unwanted events exist. For example, the radiation emitted from the patient often excites lead (K) X-rays from the collimator and other lead parts. These X-rays also impinge on the detector and may be registered as events. These X-ray photons constitute an additional source of image blurring.

The problem of X-ray induced events arises especially for radio isotopes emitting photons in the energy range of 88–120 KEV. In this range, the lead X-ray excitation probability is high and the spectrum of these photons coincides with a relevant part of the isotope's spectrum, by partially overlapping the photopeak. Thus, the unwanted part of the spectrum in each pixel has two terms: one made up of the Compton scattered photons, and the other made up of the lead X-ray photons.

In principle all of the events caused by unwanted photons should be discarded. However, it is not easy to arrive at criteria that are efficient and effective for discarding such events. For example, an energy level criterion is not effective because although the photon loses part of its energy in the scattering process, the energy resolution of the typical gamma camera is such that there is a large amount of overlap between the energy of unscattered and scattered photons.

The invention of the previously mentioned patent applications provided methods and means for qualitatively and quantitatively improving the recorded images by significantly reducing the contribution of Compton scattered and other unwanted photons to the final image thereby providing an image practically free of unwanted photons within seconds after acquisition. The inventions accomplish the task of reducing the number of events caused by unwanted photons by locally determining the energy spectrum and fitting this spectrum with a "trial" function composed of a photopeak component, a set of components representing various order of Compton scatter and, if necessary other unwanted photons, the instrumental energy dependance of all of which having been calculated or experimentally determined. The fitting procedure determines the local amplitude of the photopeak component and, if required, also the amplitudes of the other above mentioned components.

The true physical characteristics of the Compton process are used in the previously mentioned Patent Applications to derive Compton multi-scatter functions which are subsequently used to construct the Compton scatter component energy spectra. Thus, the previous Patent Applications use the following inputs to determine the unknowns; (i.e., the magnitude of the photopeak component and the magnitude of the Compton multi-scatter components):

1. the measured energy spectrum per pixel. This includes counts due to scattered and unscattered photons, and
2. the measured system energy spread function for the isotope centerline which provides the photopeak energy shape.

The shape of the Compton component of the trial function is analytically derived in the first application by using the Nishina-Klein Equation that describes the physical relativistic scattering of photons with electrons to derive a probability distribution for a photon to scatter from a given energy to a lower energy in a single interaction with an electron. Repeated convolutions are used to obtain the probability distribution for the higher order scatter terms.

By locally fitting the trial function to the measured energy spectrum of acquired data, the photopeak magnitude and possibly the values of additional components are obtained. This enables the removal of contamination of unwanted photons from the acquired data.

The invention of the above mentioned first filed application, however, assumed a single photopeak. In certain isotopes there is more than one photopeak. If a single peak is assumed when more than one peak actually exists, the removal of scattered events from the image will be incomplete.

Accordingly, the other Application was filed. The invention of that Application is an improvement over the invention of the first mentioned Application in that, among other things, it takes into account radio isotopes having more than one peak and also takes into account all unwanted events due to Compton scattered photons and photons derived from such phenomena as X-rays caused by gamma radiation interacting with lead components.

It is an object of this present continuation-in-part application, among other things, to improve the stability of the fit of the measured energy spectrum per pixel (or super pixel) to the trial function vis-a-vis local residual errors in the measurement of energy. Local residual errors include those caused by "drift" of components such as photo multiplier tubes, amplifiers, etc. The phrase, "stability of the fit" for purposes of this application, means the proximity of the fitted parameters of trial function to the real parameters of incident photon flux. Pixels as used herein included single picture elements or groups of picture elements, i.e. super pixels.

BRIEF DESCRIPTION OF THE INVENTION

The present invention represents an improvement over the invention of the patent application Ser. No. 07/889,406. That invention reduced events caused by unwanted photons including, but not limited to Compton scatter photons, and also took into account multiple photopeaks, such as are obtained when using certain radio isotopes.

It is well known that the energy corrections of the Anger camera still do not provide an exact evaluation of the incident photon energy because, among other things, the different analog electronic circuits tend to drift with time and due to temperature variations. Deviations between the actual and measured energy can be local or usually semi-local, i.e. can have different magnitudes and even different polarities for different locations in the field of view of the camera. The location and maximal order of magnitude of these deviations depends on such things as the intrinsic stability of the Anger camera electronics, temperature caused variations and the time elapsed since the last calibration.

Systematic measurements of the actual energy on the low side in some area of the field of view causes an apparent shift of the local (per pixel) spectrum towards the lower energies. Such a spectrum seems be more loaded with the low energy scattered photons than the true spectrum (see FIGS. 3a and 3b). Thus, more photons would be classified as being scattered, and the estimated number of unscattered photons would be less the true one.

Also, if for some other local areas of the field of view measurements of the energy of the photons systematically occur on the high side; the measured spectrum in such a case would have an apparent shift to the higher energies where the actual spectrum is less contaminated by the contribution of the scattered photons. In this case, less photons would be classified as being scattered and the overall estimated number of unscattered true photons could be higher than the true number (see FIG. 3c).

The present generation of commercial cameras provides an acceptable uniformity of the conventional acquisition with a symmetrical energy window if the energy calibration is run once in several weeks to once in several months. Nevertheless in systems which depend on the fit of the local (per pixel) measured energy spectrum to the trial function the local deviations of the energy evaluation are unacceptable or, at least, problematic even if they are deemed to be acceptable for the conventional imaging. In reality, in the field of view of the camera there exist areas with both positive and negative deviations between the measured and the actual energy of the incident photons. Therefore, the real image suffers from both positive (overestimation) and negative (underestimation) local artifacts.

Accordingly it is still a further objective of this invention to reduce the sensitivity of the scatter elimination procedure to the local deviations between the measured and actual energy of the incident photons.

In accordance with one preferred aspect of the present invention, the magnitude of the deviation between the actual and measured energy for typical cases can be approximated as a constant within a practical range of energies. Still the value of the constant can be position dependent. Thus the relation between the detector measured energy $\epsilon_d$ and actual energy $\epsilon$ of the incident photon can be written as follows:

$$\epsilon_d = \epsilon + \delta(X, Y) \tag{1}$$

where $\delta(X, Y)$ is the local effective deviation between the measured and actual energy of the photons.

In accordance with the present invention, there is provided in a preferred embodiment a method of more accurately reducing the contribution of unwanted photons to an image produced by a gamma ray imaging system by reducing the deviation between measured energy and true energy, said method including:

detecting photons impinging on a gamma ray detector as event counts, determining an X, Y location for each photon according to the location of the impingement of the photons on the detector, measuring the energy of said impinging photons, and grouping each detected photon according to the measured energy and the X, Y location, accumulating counts of said photons at each X, Y location according to the determined energy level of the photons, constructing a measured energy spectrum at each X, Y location using the accumulated counts of the determined energy levels, said measured energy spectrum including counts of wanted and unwanted photons, determining the energy distributions of unwanted photons, determining the energy spread function of the gamma ray imaging system being used, obtaining a system dependent energy distribution of the unwanted photons per location by using the energy distribution of the unwanted photons and the energy spread function of the system, constructing a trial function comprising the system dependent energy spread function multiplied by an unknown coefficient of wanted photons plus unknown coefficients of unwanted photons convolved with the system's energy spread function, said trial function further including the derivative of the energy spread function of the wanted photons multiplied by the unknown coefficient, solving for the unknown coefficient of the wanted photons by locally fitting the measured energy distribution to the trial energy distribution of photons, and using the count of the wanted photons to produce an image practically free of unwanted photons and free of artifacts caused by local effective deviation between the measured energy and the true energy.

According to a feature of the invention, the unwanted photons include Compton scattered photons originating from single or multiple radio isotope photopeaks.

According to another feature of the invention, the unwanted photons further include photons such as those due to lead X-rays.

BRIEF DESCRIPTION OF THE DRAWINGS

The above mentioned objects and features of the present invention along with additional objects and features will be best understood when considered in the light of the following description made in conjunction with the accompanying drawings; wherein.

GENERAL DESCRIPTION

Figure 1:
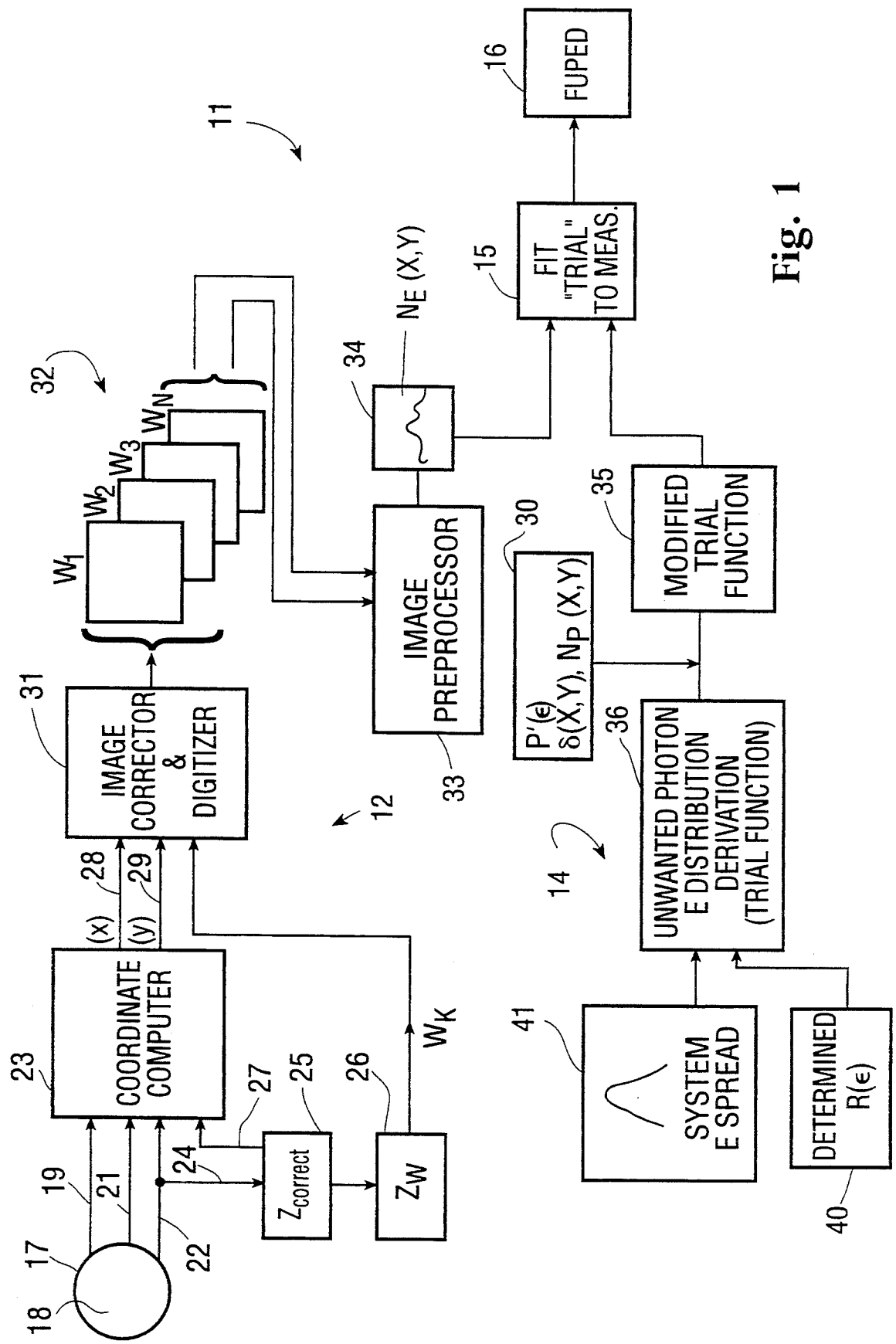
FIG. 1 is a block diagram showing of a gamma radiation imaging system for providing improved images by eliminating blurs caused in the past by inclusion of unwanted events generated by Compton scattered photons and other unwanted photons and by artifacts caused in the past by local deviations between measured energy and true energy caused by "drift" and the like, FIG. 2 represents details of the preparations, computations and operations used in the system shown in FIG. 1, FIGS. 3a–3c illustrate the decomposition of the energy spectrum under normal and shifted conditions.

FIG. 1 at 11 generally shows in block diagram form the inventive gamma camera system for producing improved images. FIG. 1 comprises a measured energy spectrum stage 12, a trial function preparation stage 14 and a curve fitting or computation stage 15 which provides an image practically free of unwanted photons and artifacts caused by deviations between measured energy $\epsilon d$ and true energy $\epsilon_i$.

The measured energy spectrum stage 12 comprises a gamma radiation detector 17. The gamma radiation detector 17 provides electrical signals responsive to events; i.e., photons impinging on the face thereof, such as indicated at 18. When an event occurs, electrical signals are provided on conductors 19, 21 and 22. These conductors 19, 21 and 22 are directed to a coordinate computer 23 which determines X and Y locations of the impingement of the photon 18 onto the detector 17.

Conductors 22 and 24 carry an electrical representation of the energy of the photon. The electrical representation of the energy is provided to an energy (Z) discrimination circuit 25. An energy processing circuit 26 divides the range of energy detected into a number of energy windows predetermined by the system operator.

When the energy is within certain limits, the energy discrimination circuit 25 sends an enable signal over conductor 27 which enables the coordinate computer to determine the X and Y coordinate locations of the event. This information is directed to an image corrector and digitizer circuit 31 which corrects and digitizes the X, Y coordinates of the event. The information on the number of events is placed into a plurality of matrices 32 dependent on the photon's energy. Each of the matrices is a memory that retains the counts of events per X, Y location for a particular energy window such as, for example, a window that extends from 22 KEV for window No. 1 and 25 KEV to 28 KEV for window No. 2, etc. The windows are shown as W1, W2, W3 extending to Wn where n is the predetermined number of energy windows.

The matrices are thus divided into X, Y locations that correspond to the co-ordinate location of the event on the detector. The X, Y locations also correspond to pixels in the final image. An imaging preprocessor 33 receives the data pixel-by-pixel from each of the windows and computes a measured or an acquired energy spectrum $N_E$ per pixel as shown in block 34. This acquired energy spectrum includes both the counts due to unwanted photons and wanted photons. The unwanted photons include Compton scatter photons and other additional unwanted photons. Note that the energy spectrum may include more than one energy peak as shown in block 34.

The trial function stage 14 of FIG. 1 prepares the trial energy distribution $n(X,Y,\epsilon)$ including wanted and unwanted events herein:

$$n(X,Y,\epsilon) = N_p(X,Y)P^{(k)}(\epsilon) + \sum_{m=1}^{M} Q_m(X,Y)\int d\epsilon' P(\epsilon',\epsilon)\pi_m^{(k)}(\epsilon') + K_o(X,Y)R(\epsilon) \quad (2)$$

where: $\epsilon = E/m_e C^2$ the true photon energy in units of electron rest energy, $m_e C^2$, $$P^k(\epsilon) = \sum_{i=1}^{k} W_i P(\epsilon_i,\epsilon);$$

is the system energy spread function at $\delta_1, \delta_2 \ldots$; ($P^k(\delta)$ can also be measured in an environment free of all unwanted photons).

(k) is a superscript denoting the number of discrete energy lines in the source, m is a subscript indicating the number of the Compton scatter order, and M is a script indicating the chosen number of Compton scatter orders included in the computation.

$\pi_m^{(k)}(\delta')$ is the energy distribution of events caused by photons scattered m times from original energies $\delta_i$ with known relative intensities $W_i$ to intermediate energy $\delta'$ (i.e., the shape of the energy probability distribution of photons scattered m times), $$\pi_m^{(k)}(\epsilon') = \sum_{i=1}^{k} W_i \pi_1(\epsilon_1,\epsilon)$$

with $\pi_m$ for m>1 being calculated recursively, $W_i$ are the known relative intensities of $\delta_i$, $$\epsilon_i, \sum_{i=1}^{k} W_i = 1.$$

$N_p(X,Y)$ is the spatial distribution (counts/pixel) of events caused by unscattered photons.

$Q_m(X,Y)$ is the spatial distribution (counts/pixel) of events caused by photons scattered m times, $\delta_1$ are the original energies of the photons emitted from a radioactive source, $\delta$ is the measured energy of the photon, $\delta'$ is an intermediate energy of a photon, $R(\delta)$ is the measured energy spectrum or additional unwanted photons such as by way of example photons from lead X-rays. (Note $R(\delta)$ can also be calculated using published tables and convolving with the system spread function).

$K_e(X,Y)$ is the spatial distribution (counts/pixel) of the events caused by the additional unwanted radiation.

An important purpose of the invention is to determine the spatial distribution of the wanted events $N_p(X,Y)$ without the measurements being degraded by local deviations.

To determine the count of events per pixel, block 15 fits the measured values; that is, the measured energy spectrum per pixel and the system energy spread function with unknowns; i.e., the magnitude of the photopeaks and the shape and magnitude of the unwanted photon spectrum to the values of the trial distribution $n(X,Y,\delta)$. The fit provides the wanted spatial distribution $N_p(X,Y)$ of the wanted photons. With the knowledge of the spatial distribution of the wanted photons, a scatter free and other unwanted photon-free image is produced as indicated at 16.

Figure 2:
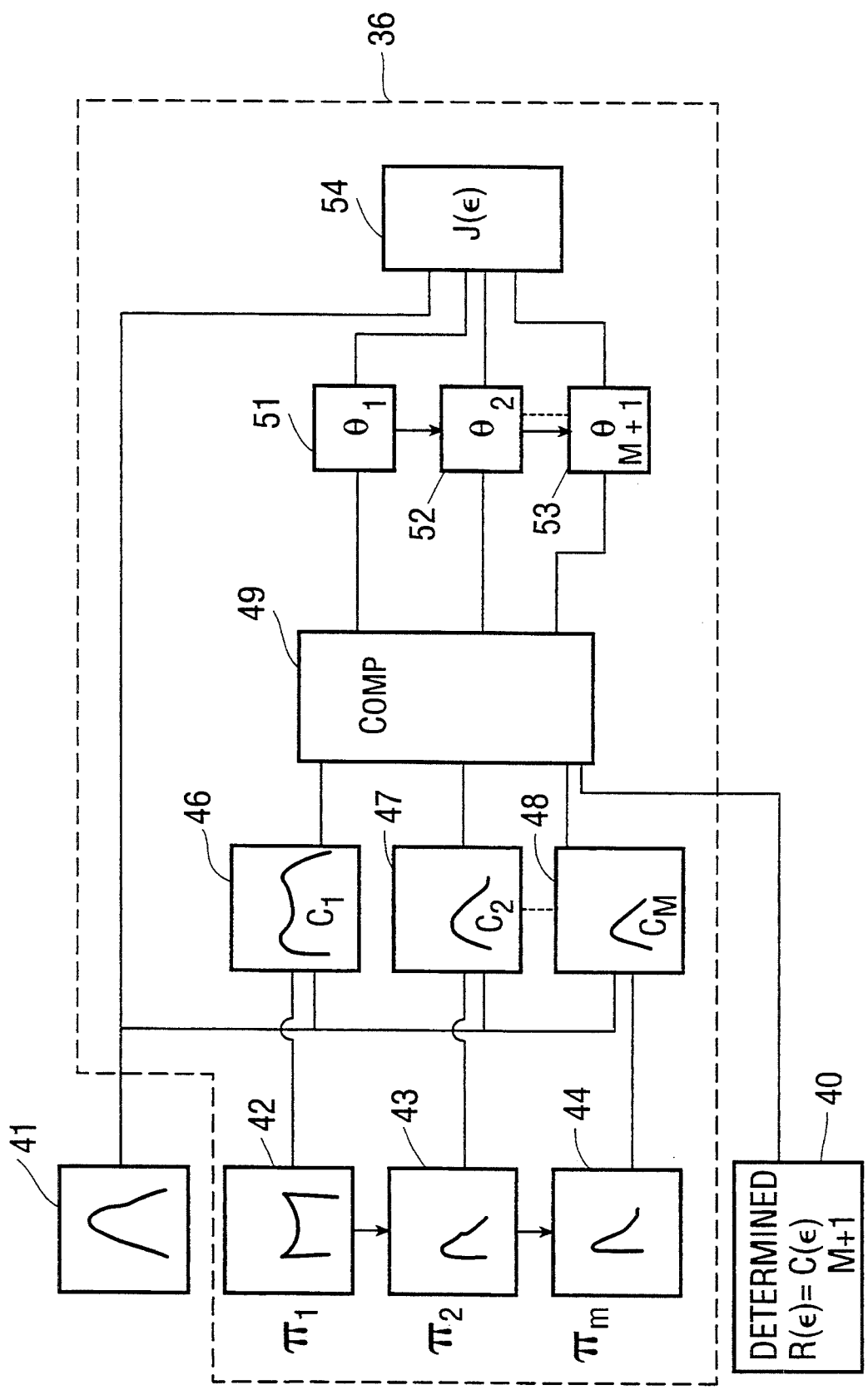

Details of the computations that occur at the trial function preparation section 14 of FIG. 1 are indicated in FIG. 2. More particularly, as shown in FIG. 2, values based on the system energy spread function shown in block 41 of FIG. 1 and FIG. 2, are entered into blocks 36 FIGS. 1 and 2. In addition, values based on additional unwanted (photons) radiation such as, for example, lead X-rays are determined (either by measurement or by computation) as shown in block 40 of FIGS. 1 and 2.

The energy spread function of the system is assumed to be known. It is evaluated once and is kept in the memory of the system. The measurement is easily accomplished by providing sources of gamma radiation of known energy and detecting the radiation with the equipment 11 of FIG. 1, for example. The detection is made without any Compton scatter media or X-ray providing lead between the energy source and the detector. This provides an energy spread function for a monoenergy source or a multi-energy source due to the detector energy resolution without unwanted photons as shown in block 41. The preparation block 36 computes $\pi_m$; i.e., the energy distribution of the unwanted photons including Compton photons, for example, and further including Compton photons for each scattering order. This is done by using the Nishina-Klein equation to derive the different orders of scattered unpolarised photons; i.e.:

$$\pi_1(\epsilon_i,\epsilon) = \begin{cases} \frac{1}{\epsilon_i^2}\left[\frac{\epsilon}{\epsilon_i} + \frac{\epsilon_i}{\epsilon} - \left(\frac{1}{\epsilon} - \frac{1}{\epsilon_i}\right)\cdot\left(2 - \frac{1}{\epsilon} + \frac{1}{\epsilon_i}\right)\right]; \frac{\epsilon_i}{1+2\epsilon_i} \leq \epsilon \leq \epsilon_i \\ 0 \quad ; \text{elsewhere} \end{cases} \quad (3)$$

is the weighted combination of the first order Compton energy distribution for each of the k photopeaks, or $$\pi_1^{(k)}(\epsilon_0,\epsilon) = \sum_{i=1}^{(k)} W_i \pi_1(\epsilon_i,\epsilon) \quad (3a)$$

Where $\epsilon_o$ is the maximum of all $\epsilon_i$ (i=1,2...k). The higher orders of scatters are derived recursively by repeated convolution using the equation:

$$\pi_m^{(k)}(\epsilon_0,\epsilon_m) = \quad (4)$$

$$\begin{cases} \int_{\epsilon_m}^{\epsilon_o} d\epsilon_{m-1} \pi_{m-1}^{(k)}(\epsilon_0,\epsilon_{m-1}) \cdot \pi_1(\epsilon_{m-1},\epsilon_m); \frac{\epsilon_o}{1+2m\epsilon_o} \leq \epsilon_m \leq \epsilon_o \\ 0 \quad ; \text{elsewhere} \end{cases}$$

elsewhere

Note that the equations are solved recursively in that each higher order equation requires knowledge of the lower prior orders.

The energy distribution of Compton scatter photons provides a curve independent of the system for each order of the scatter. However, this system independent curve is acted upon by the system energy spread function to provide the system dependent Compton multiscattered energy distributions denoted by $C_m^{(k)}(\epsilon)$. The shapes of the $C_m^{(k)}(\epsilon)$ distributions are obtained by convolving $\pi_m^{(k)}$ with the system energy spread function $P(\epsilon',\epsilon)$; i.e.:

$$C_m^{(k)}(\epsilon) = \int d\epsilon' \pi_m^{(k)}(\epsilon') P(\epsilon',\epsilon) \quad (5)$$

This set of equations provides the shape of the Compton energy distributions for each order of scatter after being operated on by the system energy spread function.

Taking into account definition of the Compton energy distributions of equation (3) and definition of the local energy shift of equation (1) the trial function defined in equation (2) can be written in the form $$n(X,Y,\epsilon_a) = N_p(X,Y) \cdot P(\epsilon_0,\epsilon + \delta(X,Y)) + \quad (6)$$

$$\sum_{m=1}^{k} Q_m(X,Y) \cdot C_m(\epsilon + \delta(X,Y))$$

This formula can be simplified using the Taylor first order approximations for functions with shifted arguments:

$$F(E+\delta) = F(E) + \delta \cdot F'(E) \quad (7)$$

where $F(\epsilon)$ is any smooth enough function and $F'$ is its derivative.

With this approximation equation (6) becomes:

$$n(X,Y,\epsilon_d) = N_p(X,Y) \cdot P(\epsilon_0,\epsilon) + \sum_{m=1}^{k} Q_m(X,Y) \cdot C_m(\epsilon) + \quad (8)$$

$$\delta(X,Y) \cdot \left(N_p(X,Y) \cdot P'(\epsilon_0,\epsilon) + \sum_{m=1}^{k} Q_m(X,Y) \cdot C_m'(\epsilon)\right)$$

For most practical cases, of all correction terms grouped in parenthesis, the contribution of the first term is dominant for two reasons:

(1) the derivative of the well shaped photopeak function $P'$ dominates derivatives $C_m'$ of the smoothly shaped Compton distributions; and (2) the amplitude $N_p(X,Y)$ of the photopeak term dominates the amplitudes $Q_m$ of Compton terms. For these reasons only the first term in parentheses will usually be retained and the trial function will then read:

$$n(X,Y,\epsilon_d) = N_p(X,Y) \cdot P(\epsilon_0,\epsilon) + \sum_{m=1}^{k} Q_m(X,Y) \cdot C_m(\epsilon) + \quad (9)$$

$$[\delta(X,Y) \cdot N_p(X,Y)] \cdot P'(\epsilon_0,\epsilon)$$

Now define an additional "auxiliary k+1 order" Compton distribution $C_{k+1}(E)$ with an effective amplitude $Q_k(X,Y)$ found in the block 30 of FIG. 1:

$$C_{k+1}(\epsilon) = P'(\epsilon_0,\epsilon)$$

$$Q_{k+1}(X,Y) = \delta(X,Y) \cdot N_p(X,Y) \quad (10)$$

This modification of the presentation enables accounting for local unknown systematic energy deviations between actual and measured photon energy while preserving the whole logic of the data processing. In essence the modification is done by expanding a real set of Compton multiple scatter distributions contributing to the trial local (per pixel) energy spectrum by adding the new "auxiliary k+1 order" term defined by equations (10). The trial function for the fit to be performed by the block 15 (FIG. 1) will then be modification trial function that is varied by block 30 and prepared in the block 35 of the FIG. 1 and will read:

$$n(X,Y,\epsilon_d) = N_p(X,Y) \cdot P(\epsilon_0,\epsilon) + \sum_{m=1}^{k+1} Q_m(X,Y) \cdot C_m(\epsilon) \quad (11)$$

All processing routines described by the equations (12)–(48) will remain the same as in the previous application but will be applied to the expanded set of the Compton multiple scattered energy distributions with the additional term being as defined in equation (10).

It should be understood that correction terms in equation *8) does not necessarily have to be limited to only the first term of the Taylor expansion series. Several more significant terms of Taylor expansion of Compton energy distributions $C_m(\epsilon)$ could be retained. Also the higher orders of the Taylor expansion could be used to generate more accurate approximations.

FIG. 2 indicates the computations result in the $\pi_m$ values using the Nishina-Klein equation in blocks 42, 43 and 44 for $\pi_1^{(k)}$ and consequently $\pi_2 \ldots_m$.

The shapes of $\pi_1^{(k)}$, $\pi_2^{(k)}$ and $\pi_m^{(k)}$ in blocks 42, 43 and 44 are shown as being convolved with the system energy spread function of block 41 in blocks 46, 47 and 48 respectively, thereby providing the shapes $C1^{(k)}$, $C2^{(k)}$, etc. The computations to determine $\pi_1^{(k)}$, $\pi_2^{(k)}$, etc., are indicated as being recursive by the arrows going from $\pi_1$ to $\pi_2^k$, etc.

Hereafter the superscript (k) denoting the number of discrete energy lines in the source is omitted from the C's.

A method for drastically reducing the number of computations is useful in this system. The reduction in the number of computations is accomplished by orthonormalization of the set $C_m(\epsilon)$. The orthonormalization is provided by constructing an orthonormal function (vector) set $\theta_m$ using the Graham-Schmidt procedure:

$$\theta_1^{(k)} = C_1 / \sqrt{<C_1^2>} \quad (12)$$

$$\theta_2^{(k)} = (C_2 <\theta_1 \cdot C_2> \theta_1) / \sqrt{<C_2^2> - <\theta_1 \cdot C_2>^2} \quad (45)$$

$$\vdots$$

$$\theta_{M+2}^{(k)} = (C_{M+2} - \sum_{l=1}^{M+1} <\theta_l \cdot C_{M+2}> \theta_l / \sqrt{<C_{M+2}^2> - \sum_{l=1}^{M+1} <\theta_l \cdot C_{M+2}>^2}$$

Where for convenience $C_{M+1}(\epsilon)$ is defined as being identical to $R(\epsilon)$ and $C_{M+2}$ is $P'(\epsilon_o, \epsilon)$.

Where sums (integrals) over energy are defined by:

$$\sum_\epsilon F(E) \equiv <F>$$

$$<\theta_i, \theta_j> = \delta_{i,j} = \begin{cases} 1, i=j \\ 0, i \neq j \end{cases}$$

The orthonormalization is accomplished in computer 49 and the results; i.e., $\theta_1, \theta_2, \ldots \theta_{M+2}$ are shown in blocks 51, 52, 53, for example.

The Compton sum, equation (5) can be rewritten using the $\theta_k$'s:

$$\begin{aligned} \Sigma Q_m C_m &= \Sigma Q_m \Sigma <C_m \theta_k> \theta_k \quad (*) \\ &= \Sigma (\Sigma <C_m \theta_k> Q_m) \theta_k \\ &= \Sigma q_k \theta_k \end{aligned} \quad (13)$$

*[with an orthonormal base $\{\theta_m\}$ any vector v can be represented as a superposition of an array of $\theta_m$:

$$v = \Sigma <v \cdot \theta_m> \theta_m \quad (14)$$

where:
$q_k = \Sigma <C_m \theta_k> Q_m$ and
$m = 1,2 \ldots M+2$
$k = 1,2 \ldots M+2$.

The trial distribution now reads:

$$n(X,Y;\epsilon) = N_p(X,Y) P(\epsilon_o,\epsilon) + C(X,Y;\epsilon_o,\epsilon) \quad (15)$$

where:

$$C(X,Y;\epsilon_0,\epsilon) = \sum_k q_k(X,Y) \theta_k(\epsilon_o,\epsilon) \quad (16)$$

Hereafter the known energy spread function, P is normalized such that $<P> = 1$.

In a preferred implementation, a least squares fit is used. More particularly, with the trial function $n(X,Y;\epsilon)$ of equation (1) and the multi-window acquisition results $N_E(X,Y)$ from block 34, a solution is sought for the number of counts caused by unscattered photons $N_p(X,Y)$ that will minimize the sum of the squares of differences for each pixel $\delta(X,Y)$:

$$\delta(X,Y) = <[n(X,Y;E) - N_E(X,Y)]^2> \quad (17)$$

More particularly, in the block 15 the following "fit" operation is performed, i.e., $$\frac{\partial \delta}{\partial N_p} = 0, \text{ and} \quad (18)$$

$$\frac{\partial \delta}{\partial q_k} = 0, \text{ where } k = 1,2,\ldots \quad (19)$$

It can be shown that the solution of these equations is:

$$N_p(X,Y) = <N_E(X,Y) J(E)> \quad (20)$$

$$q_k(X,Y) = <N_E(X,Y) G_k(E)> \quad (21)$$

where:

$$J(E) = \frac{P(E_o,E) - \sum_k <P \cdot \theta_k> \cdot \theta_k(E_0,E)}{<P^2> - \sum_k <P \cdot \theta_k>^2} \quad (22)$$

$$G_k(E) = \theta_k(E_o,E) - <P \cdot \theta_k> \cdot J(E) \quad (23)$$

Note that since J(E) and $G_k(E)$ are data independent, they can be apriori derived as indicated in FIG. 2 by block 54 which shows computing J(E) using $\theta_1, \theta_2, \ldots$ and P. The "per-pixel" operations entail only the evaluation of the scalar product $$N_p = <N_E \cdot J(E)>. \quad (24)$$

The fit, therefore, determines the per pixel Compton scatter free count $N_p$.

To compensate for low statistics per pixel per energy window, the relative constancy of scatter distributions over large spatial domains is put to advantage by us of a "quasi-local" solution. Any type of smoothing technique known to those skilled in the art can be used to this end. In a preferred embodiment an expanded or "large" pixel is preferably used. Thus, if the currently processed pixel is $(X_o, Y_o)$ the spatial window W is defined as:

$$(X_o - W) \; X \; (X_o + W); \; (Y_o - W) \; Y \; (Y_o + W) \quad (25)$$

of area $s = (2W+1)^2$.

When the Compton component of the entire window s, C is computed, the "per-pixel" Compton activity, $C^1$ can be approximated by its average:

$$C^1 = C/s. \quad (26)$$

The measured activity in the spatial windows (symmetric around the coordinates (X,Y)) is denoted as $N_E^s(X,Y)$, and the (X,Y)-pixel activity is denoted as $N_E(X,Y)$. A single parameter fit is done to find the local photopeak count. It can be shown that this is given by:

$$N_p(X,Y) = <N_E(X,Y) \; A_E + N_E(X,Y) \cdot A_E> \quad (27)$$

where:

$$A_E^1 = P(E)/<P^2> \quad (28)$$

$$A_E^S = [J(E) - A_E^g]/s \quad (29)$$

Solving for $N_p^1(X,Y)$ gives the count/pixel of the Compton free image.

An alternative fitting method is the Maximum Likelihood Method. Given the measured activities $\{N_E\}$ the joint Poisson probability with respect to the parameters of the trial function n(E) is maximized; i.e., find n(E) such that $$P = \pi_E \left( \frac{n(E)^{N_E} e^{-n(E)}}{N_E!} \right) = \text{maximum} \quad (30)$$

or sin P is positive:

$$\ln P = <N_E \ln n(E) - n(E) - \ln N_e!> = \text{maximum} \quad (31)$$

It can be shown that for the maximum likelihood solution:

$$<n(E)> = <N_E>$$

which enables eliminating $N_p$ from the n(E) function. (hereafter (X,Y) are implicit, e.g., $n(X,Y;E) = n(E)$). Thus from equations (8) and (9) it follows that:

$$n(E) = <N_E>P + \sum_k q_k(\theta_k - <\theta_k>P) \quad (32)$$

Calculating the derivatives of lnP with respect to $q_k$ and setting the resulting equation to 0 as required by the maximum condition, the following equations are obtained:

$$<\frac{N_E}{n(E)} (\theta_k - <\theta_k>P)> = 0; \quad k = 1,2,\ldots \quad (33)$$

This is a set of non-linear coupled equations and cannot be solved in closed form. Using the multi-gradient method, an iterative solution for the $q_k$s can be obtained. Denoting $\delta q_k$ as the difference between $q_k$ before and $q'_k$ after the iteration $$\delta q_k = q'_k - q_k. \quad (34)$$

The coupled set of equations is linearized and soluble $$\sum_j M_{ij} \delta q_j = U_i \quad (35)$$

$$M_{ij} = <\frac{N_E}{n^2(E)} (\theta_i - <\theta_i>P)(\theta_j - <\theta_j>P)> \quad (36)$$

$$U_i = <\frac{N_E}{n(E)} (\theta_i - <\theta_i> \cdot P)> \quad (37)$$

After proper convergence of the solution for the array $q_k$ has been attained, the Compton free activity $N_p$ can be obtained from:

$$N_P = <N_E> - \sum_k q_k <\theta_k> \quad (38)$$

Yet another alternative fit is the partial Maximum Likelihood Solution. Suppose that the least square solution provides the approximate functional structure of the Compton component. However, it is desired to introduce Poisson statistics by changing the ratio of the photopeak to Compton events fraction in order to optimize the joint distribution. The trial function, n(E), then is $$n(E) = <N_E>[f_p \cdot P + (1-f_p)\hat{C}] \quad (39)$$

where:

$$f_P = \frac{N_P}{<N_E>} \text{ is the photopeak fraction} \quad (40)$$

and $\hat{C}$ is the least square Compton solution, normalized to 1; i.e.:

$$\hat{C} = C/<C> \quad (41)$$

Now, the Maximum Likelihood Equation is maximized with respect to a single parameter, the photopeak fraction, $f_p$. Once $f_p$ is calculated, the scatter-free event distribution $N_p$ can be found using the equation:

$$N_p = f_p <N_E> \quad (42)$$

The optimization equation resulting from the differentiation with respect to $f_p$ reads:

$$<\frac{N_E(P - \hat{C})}{\hat{C} + f_P(P - \hat{C})}> = 0 \quad (43)$$

It is soluble by an iterative Newton-Raphson method:

$$f_P = f_P + \frac{<N_E \cdot \tau>}{<N_E \cdot \tau^2>} \tag{44}$$

where:

$$\tau \equiv \frac{P - C}{C + f_P(P - C)} \tag{45}$$

Yet another related method of obtaining the value of $N_p$ involves the semi-local Maximum Likelihood Fit Solution. As for the quasi-local solution, this is implemented here as follows: First a solution is obtained for the square of area $S=(2W+1)^2$ surrounding the pixel $X_o$, $Y_o$, i.e.:

$$S: (X_o-W) \leq X \leq (X_o+W), (Y_o-W) \leq Y \leq (Y_o+W) \tag{46}$$

Once the Compton free component of the entire window has been obtained, either by the full or by the partial Maximum Likelihood method; i.e., $N_p{}^s(X,Y)$ is known, the slow Compton spatial variance is used by assuming:

$$C^1 = C/s \tag{47}$$

to obtain the (X,Y)-pixel Compton free activity:

$$N_P^1 = \frac{N_P}{s} + <N_E^1 - \frac{N_E^s}{s}> \tag{48}$$

If it is desired to eliminate the events caused by additional unwanted photons then block 40 is used to include such additional unwanted photons originated events in the "trial" equation.

In operation, the inventive system locally analyzes the energy spectrum which may comprise multiple energies and fits it with a trial function comprising combination of the unscattered photopeak function and a function, representing the Compton scattered spectrum, and a function representing other unwanted photons. The trial function is modified by the addition of derivatives of at least one of its terms multiplied by unknown coefficients.

The function representing the Compton scattered spectrum is derived using the Nishina-Klein formula. The Compton scatter spectrum shape, therefore, inherently reflects the true realistic distributions of the Compton scatter, unlike the previously used arbitrary polynomials. The function representing other unwanted photons can either be measured or computed. If measured, the system spread function is automatically included in the result. If computed, the result must be convolved with the system spread function.

The Nishina-Klein formula is recursively used to generate the multi-scattered Compton distribution $\pi_m{}^{(k)}$. Then each $\pi_m{}^{(k)}$ is convolved with the system energy spread function to obtain $C_m$, the system dependent Compton scatter distributions. The convolved functions are averaged or integrated for discrete windows to obtain discrete arrays required for the calculations. The set of discrete functions $C_i{}^{(k)}$ is then preferably orthonormalized to reduce the number of computations necessary and to assure that the inventive system can provide images practically free of Compton scatter within seconds after acquisition. If additional unwanted photons are to be removed and/or stabilization through the use of derivatives is to be used, the respective functions are to be included in the orthonormalization process. The trial function to be fitted to the measured energy distribution at each location is now comprised of the photopeak and the above set of orthorormalized functions. Local (and quasi-local) fitting can be used to expedite obtaining the desired coefficients of the fit functions.

A unique approach of the invention is that the parameters to be determined are coefficients of the physical Compton scatter functions. The said functions have the correct high energy threshold behavior ensuring a better fit with less coefficients.

The inventive method also preferably improves the statistics for the calculations for the Compton fit by a method that takes advantage of the smoothness of the Compton distribution (quasi-local method). That is, the data in a preferred embodiment is summed over $(2n+1)$ square pixels for the fit where n is an integer. The values are then attributed only to the central pixel of the square. Similar calculations are done for each pixel.

Preferably a least square fit is used to solve the unknown coefficients, i.e., the amount per pixel of the unscattered events (and if desired for the amount per pixel of the scattered events). However, several variations employing the maximum likelihood fit are also described and are within the scope of this invention.

Figure 3A:
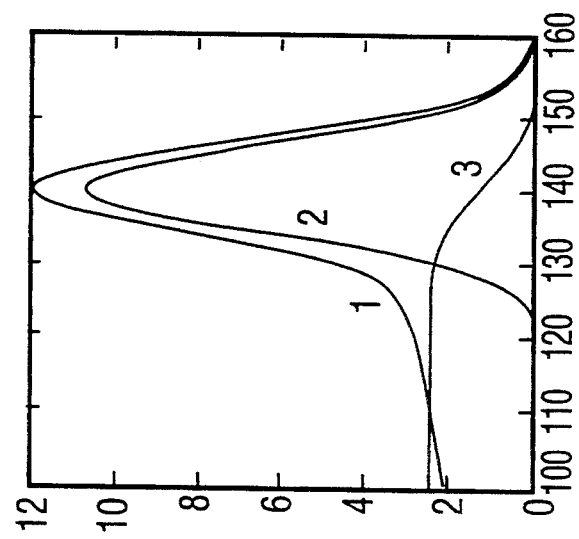

FIG. 3a illustrates a measurement with perfect energy calibration. Curve 1 is the measured spectrum; curve 2 is the fitted unscattered spectral component and curve 3 is the fitted scattered component.

Figure 3B:
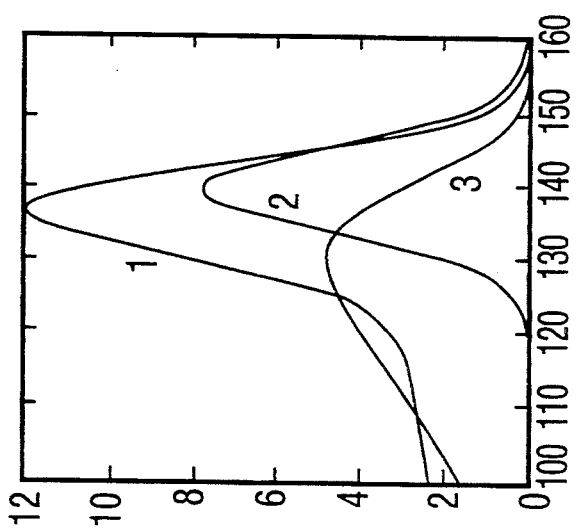

FIG. 3b illustrates at curve 1 the same measured spectrum with an energy shift of $-1$ units. The area under fitted curve 2 is underestimated while the area under fitted curve 3 is overestimated.

Figure 3C:
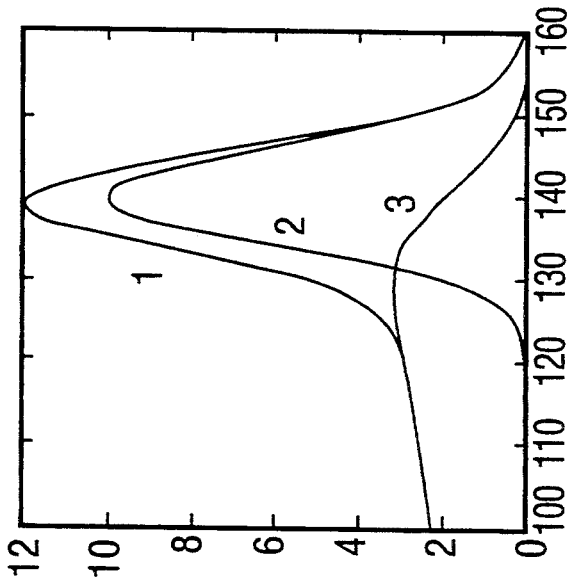

FIG. 3c illustrates at curve 1 the same measured spectrum with an energy shift of $+2$ units. The area under fitted curve 2 is overestimated while the area under fitted curve 3 is underestimate.

While the invention has been described with regard to specific embodiments, it should be understood that the description is made by way of example only and not as a limitation of the scope of the invention which is defined by the accompanying claims.

What is claimed is:

1. A method of improving images from a gamma camera system by considering isotopes have k photopeaks where $k \geq 1$ and by reducing the contribution of unwanted photons on an image produced by a gamma ray imaging system, said method including the steps of:
   detecting photons impinging on a gamma ray detector in an X,Y coordinate location according to the location of the impingement on the detector,
   determining the energy of each detected photon,
   grouping each detected photon according to the determined energy in the X, Y coordinate location,
   accumulating counts of said grouped photons according to the determined energy level of the photons at each X, Y coordinate location,
   constructing an energy spectrum of each X, Y location using the accumulated counts,
   determining a system dependent energy distribution of different components of unwanted photons,
   determining the energy spread function of the gamma camera system for the known energies of the wanted photons,
   constructing a trial function comprising the system energy spread function multiplied by a first unknown coefficient of wanted photons plus the system dependent energy distributions of the components of unwanted photons multiplied by their unknown coefficients modifying the trial function by including in the trial function the first n derivatives of the system energy spread function of each of the k photopeaks multiplied by unknown coefficients, locally fitting the modified trail function to the constructed energy spectrum to obtain the count of the wanted photons.

using the count of the wanted photons to produce an image practically free of unwanted photons.

2. The method of improving images from gamma camera systems of claim 1 wherein unwanted photons include Compton scattered photons.

3. The method of claim 1 wherein the step of determining the system dependent energy distributions of the different components of unwanted photons comprises the steps of:

determining at least part of the system independent energy distributions of the components of the unwanted photons, determining the energy spread function of the gamma camera system for the determined energies of the components of the unwanted photons, and using the determined energy distribution of unwanted photons and the energy spread function of the system to obtain a system dependent energy distribution of the unwanted photons per X, Y coordinate location.

4. The method of improving images from gamma camera systems of claim 2 wherein said unwanted photons include other unwanted photons.

5. The method of claim 2 wherein said unwanted photons include lead X-ray photons.

6. The method of claim 1 wherein the step of locally fitting the modified trial function includes obtaining the counts of unwanted photons.

7. The method of claim 1 wherein the step used to obtain the system dependent energy distributions of wanted photons includes the step of calculating the energy distributions of wanted photons for each value of discrete energy lines in a source and determining the first n derivatives of the energy spread function for each discrete energy line in the source.

8. The method of claim 3 wherein the step of using the determined energy distribution of unwanted photons and the energy spread function of the gamma ray imaging system includes convolving the energy distribution of unwanted photons with the energy spread function of the gamma ray imaging system.

9. The method of claim 1 wherein the step of using the determined energy distribution of unwanted photons and the energy spread function of the system includes the step of measuring at least one energy distribution of unwanted photons with the system whereby the measured distribution inherently includes the energy spread function of the system.

10. The method of claim 8 wherein said step of constructing a trial function comprises:

summing the convolved system dependent energy distribution of the determined energy distribution of unwanted photons including the system energy distribution of Compton scattered photons and additional unwanted photons both with unknown X, Y coefficients, and locally fitting the trial function to the constructed energy spectrum to solve for the unknown X, Y coefficients and thus for determining the counts of the unscattered photons.

11. The method of claim 10 wherein said step of determining the energy distribution of unwanted photons comprises the step of:

analytically determining the energy distribution of Compton scattered photons.

12. The method of claim 11 wherein the step of analytically determining the energy distribution of Compton scattered photons includes the steps of:

convolving the energy distribution of the first order photon scatter probability distribution with the m order photon scatter probability distribution to determine the energy distribution of the m+1 order scattered photons where m=1,2...M-1, and convolving the energy distribution of the m-order scatter photons where m=1,2...M with the energy spread function of the system to obtain system dependent probability distributions of m order scatter photons.

13. The method of claim 12 including the step of obtaining a set of discrete functions from the energy distribution of the m-order Compton scatter photons by averaging the calculated Compton energy distributions for each grouping.

14. The method of claim 13, including the step of reducing the number of calculations.

15. The method of claim 14 wherein the step of reducing the number of calculations comprises converting discrete functions into an orthonormal set of functions.

16. The method of claim 1 wherein the fitting step includes:

using quasi-local pixels to obtain local counts of the scattered photons, and doing a single parameter fit to determine the local counts at each of the discrete photopeaks.

17. The method of claim 16 wherein the step of using quasi-local pixels comprises:

using large pixels comprising a $(2n+1) \times (2m+1)$ rectangle of pixels where both n and m are positive integers and the value of the large pixel is divided by the number of pixels in the large pixel and attributed to the center pixel, and evaluating all pixels in this method.

18. The method of claim 1 wherein the step of locally fitting the trial function to the constructed energy spectrum is accomplished using least square fitting.

19. The method of claim 1 wherein the step of locally fitting the trial function to the constructed energy spectrum is accomplished using a maximum likelihood fit.

20. The method of claim 1 wherein the step of locally fitting the trial function to the constructed energy spectrum is accomplished using a partial maximum likelihood fit.

21. The method of claim 1 wherein the step of locally fitting the trial function to the constructed energy spectrum is accomplished using a combined least square and maximum likelihood fit.

22. The method of claim 1 wherein n=1.

23. The method of claim 1 wherein n>1.

24. The method of claim 1 wherein k=1.

25. The method of claim 1 wherein k>1.

26. A system for improving images from a gamma camera system by considering isotopes having k photopeaks where $k \geq 1$ and by reducing the contribution of unwanted photons on an image produced by a gamma ray imaging system, said system comprising:

a gamma camera detector for detecting gamma photons impinging thereon at an X, Y coordinate location, means for determining the energy of each detected photon, means for grouping each detected photon according to the determined energy in the X, Y coordinate location, means for accumulating counts of said grouped photons according to the determined energy level of the photons at each X, Y coordinate location, means for constructing an energy spectrum of each X, Y location using the accumulated counts, means for determining a system dependent energy distribution of different components of unwanted photons, means for determining the energy spread function of the gamma camera system for the known energies of the wanted photons, means for constructing a trial function comprising the system energy spread function multiplied by a first unknown coefficient of wanted photons plus the system dependent energy distributions of the components of unwanted photons multiplied by their unknown coefficients, means for modifying the trial function by including in the trial function the first n derivatives of the system energy spread function of each of the k photopeaks multiplied by unknown coefficients, means for locally fitting the modified trial function to the constructed energy spectrum to obtain the count of the wanted photons, means for using the count of the wanted photons to produce an image practically free of unwanted photons.

27. The system of improving images from gamma camera systems of claim 26 wherein unwanted photons include Compton scattered photons.

28. The system of claim 26 wherein the means of determining the system dependent energy distributions of the different components of unwanted photons comprises:

means for determining at least part of the system independent energy distributions of the components of the unwanted photons, means for determining the energy spread function of the gamma camera system for the determined energies of the components of the unwanted photons, and means for using the determined energy distribution of unwanted photons and the energy spread function of the system to obtain a system dependent energy distribution of the unwanted photons per X, Y coordinate location.

29. The system of improving images from gamma camera systems of claim 27 wherein said unwanted photons include other unwanted photons.

30. The system of claim 27 wherein said unwanted photons include lead X-ray photons.

31. The system of claim 26 wherein the means for locally fitting the modified trial function includes obtaining the counts of unwanted photons.

32. The system of claim 26 wherein the means for obtaining the system dependent energy distributions of wanted photons includes means for calculating the energy distributions of wanted photons for each value of discrete energy lines in a source and means for determining the first n derivatives of the energy spread function for each discrete energy line in the source.

33. The system of claim 28 wherein the means for using the determined energy distribution of unwanted photons and the energy spread function of the gamma ray imaging system includes means for convolving the energy distribution of unwanted photons with the energy spread function of the gamma ray imaging system.

34. The system of claim 26 wherein the means for using the determined energy distribution of unwanted photons and the energy spread function of the system includes means for measuring at least one energy distribution of unwanted photons with the system whereby the measured distribution inherently includes the energy spread function of the system.

35. The system of claim 33 wherein said means for constructing a trial function comprises:

means for summing the convolved system dependent energy distribution of the determined energy distribution of unwanted photons including the system energy distribution of Compton scattered photons and additional unwanted photons both with unknown X, Y coefficients, and means for locally fitting the trial function to the constructed energy spectrum to solve for the unknown X, Y coefficients and thus for determining the counts of the unscattered photons.

36. The system of claim 35 wherein said means for determining the energy distribution of unwanted photons comprises:

means for analytically determining the energy distribution of Compton scattered photons.

37. The system of claim 36 wherein the means for analytically determining the energy distribution of Compton scattered photons includes:

means for convolving the energy distribution of the first order photon scatter probability distribution with the m order photon scatter probability distribution to determine the energy distribution of the $m+1$ order scattered photons where $m=1,2...M-1$, and means for convolving the energy distribution of the m-order scatter photons where $m=1,2...M$ with the energy spread function of the system to obtain system dependent probability distributions of m order scatter photons.

38. The system of claim 37 including means for obtaining a set of discrete functions from the energy distribution of the m-order Compton scatter photons by averaging the calculated Compton energy distributions for each grouping.

39. The system of claim 38, including means for reducing the number of calculations.

40. The system of claim 39 wherein the means for reducing the number of calculations comprises means for converting discrete functions into an orthonormal set of functions.

41. The system of claim 26 wherein the means for fitting includes:

means for using quasi-local pixels to obtain local counts of the scattered photons, and means for doing a single parameter fit to determine the local counts at each of the discrete photopeaks.

42. The system of claim 41 wherein the means for using quasi-local pixels comprises:

means for using large pixels comprising a $(2n+1) \times (2m+1)$ rectangle of pixels where both n and m are positive integers and the value of the large pixel is divided by the number of pixels in the large pixel and attributed to the center pixel, and means for evaluating all pixels in this method.

43. The system of claim 26 wherein the means for locally fitting the trial function to the constructed energy spectrum comprises least square fitting means.

44. The system of claim 26 wherein the means for locally fitting the trial function to the constructed energy spectrum comprises means for performing a maximum likelihood fit.

45. The system of claim 26 wherein the means for locally fitting the trial function to the constructed energy spectrum comprises means for performing a partial maximum likelihood fit.

46. The system of claim 26 wherein the means for locally fitting the trial function to the constructed energy spectrum comprises means for performing a combined least square and maximum likelihood fit.

47. The system of claim 26 wherein $n=1$.
48. The system of claim 26 wherein $n>1$.
49. The system of claim 26 wherein $k=1$.
50. The system of claim 26 wherein $k>1$.

* * * * *

UNITED STATES PATENT AND TRADEMARK OFFICE
CERTIFICATE OF CORRECTION

PATENT NO. : 5,438,202
DATED : August 1, 1995
INVENTOR(S) : A. NATANSON et al.

It is certified that error appears in the above-indentified patent and that said Letters Patent is hereby corrected as shown below:

On the cover of the patent, in section [75], and [19], Inventors, line 1, change "Matanzon" to --Natanzon--.

On the cover of the patent, in section [75], Inventors, line 2, change "Maop" to --Maor--.

On the cover of the patent, in section [75], Inventors, line 2, change "Sott" to --Soil--.

On the cover of the patent, insert at section [30], Foreign Application Priority Data, --Israeli Patent Application No. 98420, filed June 9, 1991--.

Signed and Sealed this

Twenty-third Day of January, 1996

Attest:

BRUCE LEHMAN

Attesting Officer     Commissioner of Patents and Trademarks